United States Patent
Wadsworth

(10) Patent No.: US 11,148,372 B2
(45) Date of Patent: Oct. 19, 2021

(54) SYSTEM AND METHOD FOR FORMING INTEGRAL FLANGE IN COMPOSITE LAMINATE STRUCTURE AFTER LAYUP

(71) Applicant: SPIRIT AEROSYSTEMS, INC., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 39 days.

(21) Appl. No.: 16/826,441

(22) Filed: Mar. 23, 2020

(65) Prior Publication Data

US 2021/0291465 A1    Sep. 23, 2021

(51) Int. Cl.
   *B29C 70/34*    (2006.01)
   *B29C 53/04*    (2006.01)

(52) U.S. Cl.
   CPC .......... *B29C 70/345* (2013.01); *B29C 53/043* (2013.01)

(58) Field of Classification Search
   CPC .................................. B21D 5/008; B21D 5/08
   See application file for complete search history.

(56) References Cited

U.S. PATENT DOCUMENTS

| 10,974,414 B2 * | 4/2021 | Kato | ................ B29C 63/04 |
| 2018/0021832 A1 * | 1/2018 | Zhou | ................ B21D 5/08 |
| | | | 72/352 |

\* cited by examiner

*Primary Examiner* — Barbara J Musser
(74) *Attorney, Agent, or Firm* — Hovey Williams LLP

(57) ABSTRACT

A system and method for forming an integral flange in an end portion of a composite laminate structure, such as an aerospace or other vehicle structure. First and second tool components cooperate to support the structure during a layup process, with the second tool component imparting an initial angle to the end portion. A third tool component includes a male radius positioned at an apex of the initial angle. A heater heats a succession of localized areas along the end portion to lower a viscosity of the resin. A roller applies pressure to the succession of localized areas after each is heated so as to push them around and against the third tool component to form a flange angle and the integral flange. The heater and the roller may make multiple passes along the end portion, with the roller angle increasing with each pass until the flange angle is achieved.

20 Claims, 7 Drawing Sheets

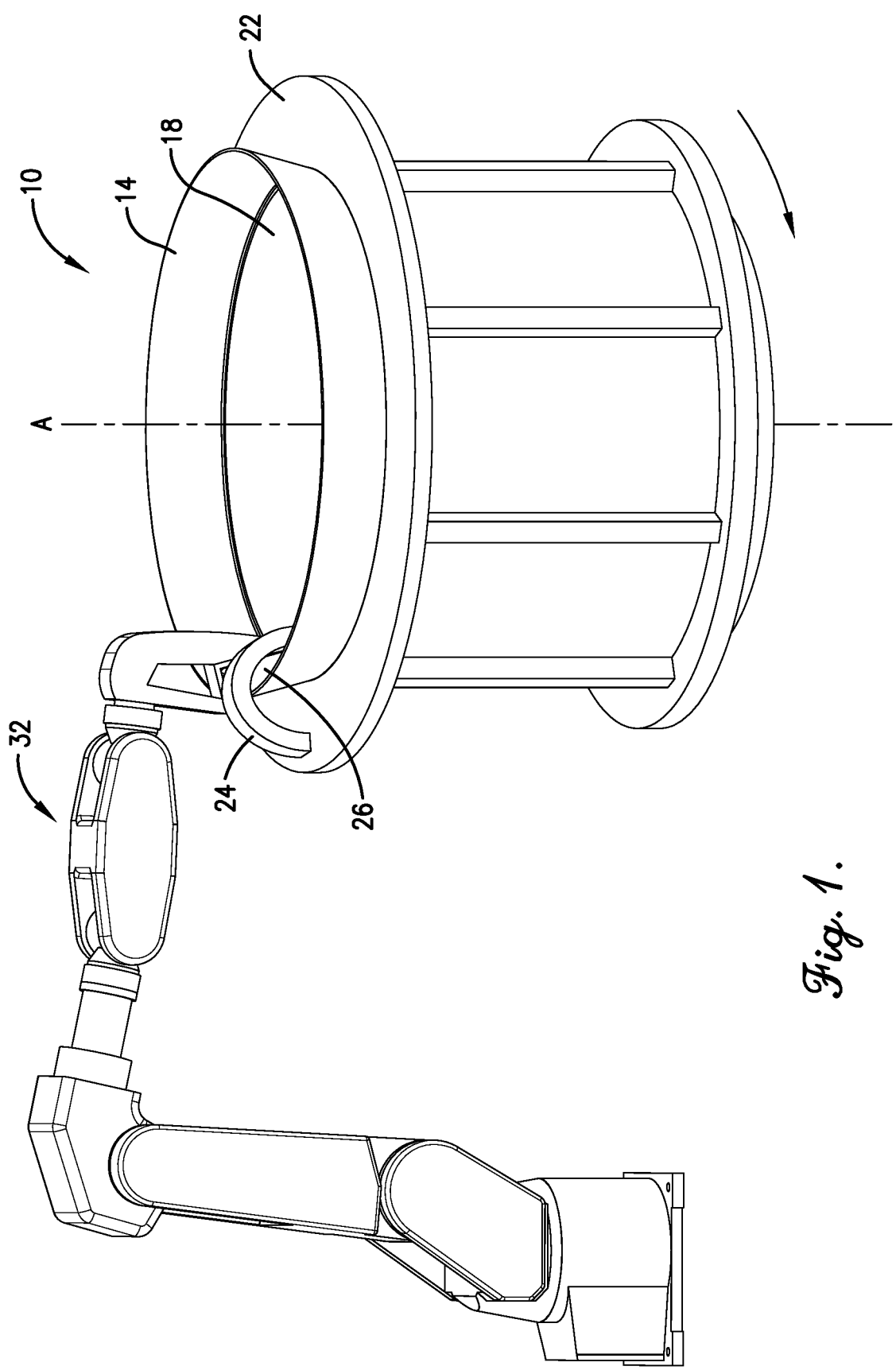

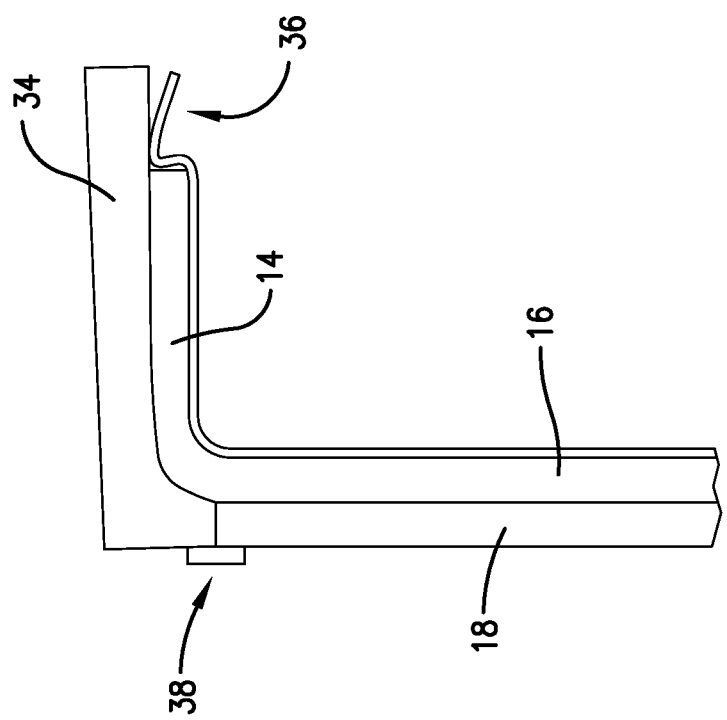

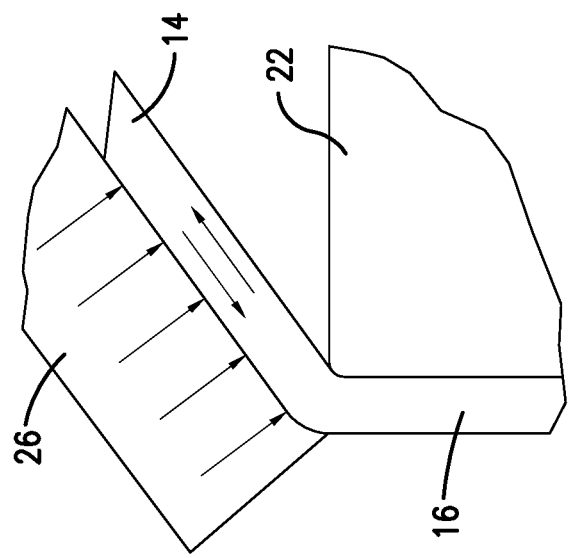
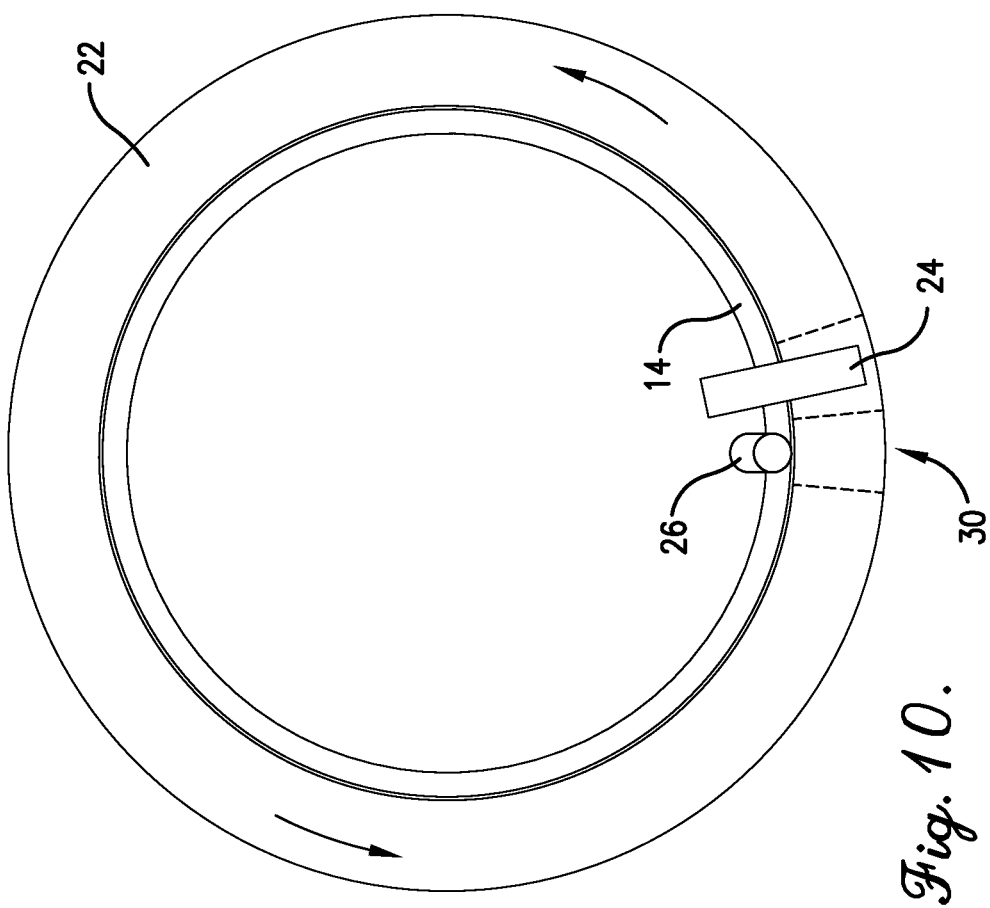

SYSTEM AND METHOD FOR FORMING INTEGRAL FLANGE IN COMPOSITE LAMINATE STRUCTURE AFTER LAYUP

FIELD

The present invention relates to systems and methods for manufacturing composite laminate structures, and more particularly, embodiments concern a system and method for forming an integral flange in a composite laminate structure after layup in, e.g., an aerospace or other vehicle structure.

BACKGROUND

In aerospace vehicles, composite laminate fan cases, inlet barrels, and other structures are sometimes attached using approximately ninety degree external flanges that simplify assembly, eliminate heavy attach fittings, and eliminate blind fasteners into the skins of the vehicles. This solution may be particularly desirable for inlet structures where fasteners can interfere with acoustic treatments. However, tight radii in flanges are difficult to mold due to bridging and a tendency to form wrinkles. Ply-by-ply hand layup is one potential solution, but it can be difficult to hand layup fabric into a female radius without porosity because as the part consolidates the outermost plies are unable to slip and may bridge the radius, which prevents full compaction. This problem becomes increasingly pronounced with thicker laminates and tighter radii.

Generally, a flange is formed in a single action in which a tool, diaphragm, or bladder is actuated to push and form the entire flange at once. In one version, the flange is heated and the bladder deflects the entire heated flange against a tool. If one area is relatively hotter than other areas then the lower local viscosity can promote localized trellising. Further, because the bladder applies relatively uniform pressure to the plies, wrinkling, rather than intra-ply slippage, may occur at the inside of the radius, depending on the width, laminate thickness, and radius of the flange. In particular, forming wrinkles may develop where the inner plies are in compression on the inside of the vertex, and consolidation wrinkles may develop during curing where the outer plies have excess length due to excess bulk on the outside of the vertex.

This background discussion is intended to provide information related to the present invention which is not necessarily prior art.

SUMMARY

Embodiments address the above-described and other problems and limitations in the prior art by providing a system and method for forming an integral flange in a composite laminate structure after layup in, e.g., an aerospace or other vehicle structure.

In one embodiment, a system is provided for forming an integral flange in an end portion of a composite laminate structure. The system may comprise first, second, and third tool components, a heater, and a roller. The first and second tool components may cooperate to physically support the structure during a layup process involving a plurality of plies of fibers impregnated with a resin, with the second tool component imparting an initial angle to the end portion. The third tool component may include a male radius positioned opposite the first tool component at an apex of the initial angle. The heater may heat a succession of localized areas along the end portion to lower a viscosity of the resin. The roller may apply pressure to each localized area along the end portion after each localized area is heated so as to push each localized area around the third tool component to form a flange angle and against the third tool component to form the integral flange. The heater and the roller may make two or more passes along the end portion, and with each pass an angle of the roller may be increased until the flange angle is achieved.

In another embodiment, a method is provided for forming an integral flange in an end portion of a composite laminate structure. The method may comprise the following steps. First and second tool components may be positioned so as to cooperate in physically supporting the structure during a layup process involving a plurality of plies of fibers impregnated with a resin, with the second tool component imparting an initial angle to the end portion. A third tool component may include a male radius positioned opposite the first tool component at an apex of the initial angle. A succession of localized areas along the end portion may be heated by a heater to lower a viscosity of the resin. Each localized area along the end portion may be subjected to pressure applied by a roller as each localized area is heated so as to push each localized area around the third tool component to form the flange angle and against the third tool component to form the integral flange. The heater and the roller may make two or more passes along the end portion, and with each pass an angle of the roller may be increased until the flange angle is achieved Various implementations of the foregoing embodiments may include any one or more of the following features. The composite laminate structure may be a component of an aerospace vehicle. The initial angle may be between five degrees and forty-five degrees. The heater may heat each localized area to between one hundred thirty degrees and one hundred fifty degrees Fahrenheit. The heater may heat each localized area by delivering a stream of heated air against the localized area. The roller may apply a relatively higher pressure against the end portion at the apex of the flange angle, and may apply a relatively lower pressure against an opposite end of the end portion. The heater and the roller may remain stationary while the end portion is moved past the heater and the roller. An arm may physically support the heater and the roller and move the heater and the roller along the end portion. The flange angle may be between seventy-five degrees and one hundred five degrees.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 is a perspective view of an embodiment of a system for forming an integral flange in a composite laminate structure after layup;

FIG. 9 is a fragmentary cross-sectional elevation view of the portion of the system of FIG. 8 prepared for curing;

FIG. 10 is a plan view of a portion of the system of FIG. 1 showing the heater and the roller as they would appear in FIGS. 4-8, with arrows indicating their movement along the end portion;

Figure 12:
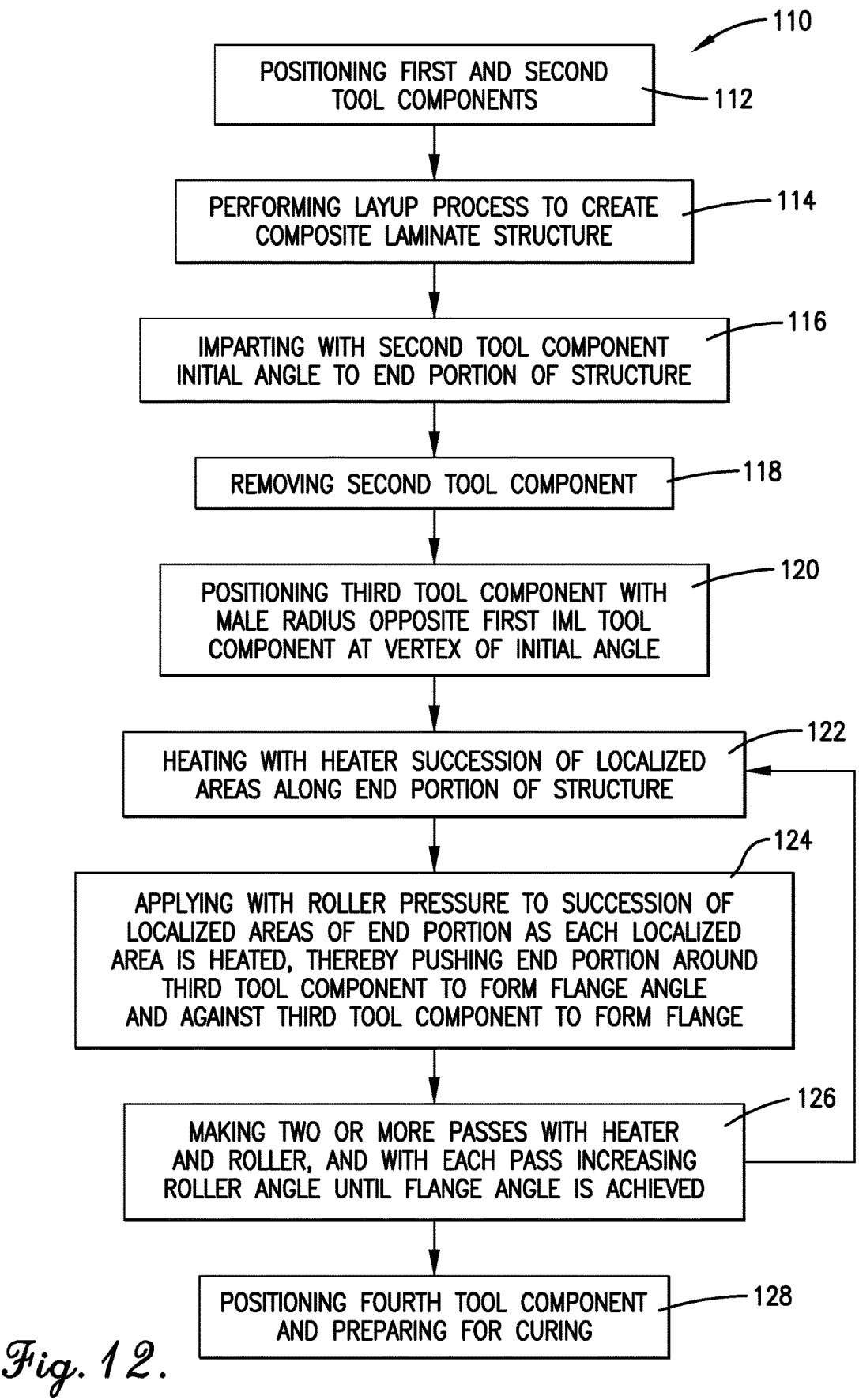

FIG. 11 is fragmentary cross-sectional elevation view of the roller component applying pressure to the end portion, wherein arrows within the roller indicate pressure and arrows within the integral flange indicate slippage of plies and/or fibers within the end portion as the end portion is bent; and FIG. 12 is a flowchart of steps in an embodiment of a method for forming an integral flange in a composite laminate structure after layup.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments provide a system and method for forming an integral flange in a composite laminate structure after layup. Embodiments employ a heater in advance of a roller to incrementally form the flange by heating and applying pressure to bend a succession of localized areas of an end portion of a laid-up composite laminate structure around a male radius. The inflection point where the bending occurs is compressed by the roller against the male radius such that one or more outer layers of the laminate are in compression and do not buckle.

This localized heating and incremental deflection advantageously ensures that ply slippage and material trellising occurs only locally, thereby preventing the accumulation of deformations that could occur if the flange was formed entirely at once. If the entire flange was heated or formed at once, the location where ply slippage and/or trellising initiated may become over-distorted because the dynamic friction coefficient is typically lower than the static friction coefficient. Once slippage begins, it requires less force to continue at that location than to initiate slippage elsewhere. Embodiments advantageously apply heat and pressure in the same local area, thereby limiting distortion to that area. Further, embodiments advantageously properly and predictably distribute fiber orientation distortion because the rate of deformation and associated viscoelastic forces are minimized by incremental forming.

Embodiments advantageously eliminate undesirable bridging associated with consolidation because the flange is formed onto a male radius. Further, embodiments advantageously minimize wrinkling associated with male radius consolidation because the roller applies the most pressure to the radius throughout the forming process because since this area is backed by a tool while the remainder of the flange is not. Embodiments advantageously use small incremental advances for each roller pass, which minimizes the rate of the displacement and the associated viscoelastic forces and provides time for them to relax before the next pass, thereby avoiding accumulation. Further, localized heating ahead of the roller ensures that the deformation occurs locally while the temperature is high and viscosity is low. Subsequent repeat passes over the area continue to compact the laminate in the radius and force excess material into the flange even as the nip point progressively moves up the radius and outward. This repeated compaction reduces the consolidation necessary during cure, which eliminates the accumulation of excess material on the radius and thereby reduce the tendency for wrinkling.

Referring to FIGS. 1-11, an embodiment of a system 10 for forming an integral flange 12 in an end portion 14 of a composite laminate structure 16 after layup may include a first inner mold line (IML) tool component 18; a second IML tool component 20; a third outer mold line (OML) tool component 22; a heater 24; and a roller 26. The functioning of the system 10 may generally follow the steps of the method 110, described below. The system 10 may have example application in manufacturing composite laminate aerospace or other vehicle structures, such as in forming flanges in uncured composite laminate barrel structures. Thus, the composite laminate structure 16 may be a fan case, inlet barrel, or other generally cylindrical structure for incorporation into an aerospace or other vehicle.

Figure 2:
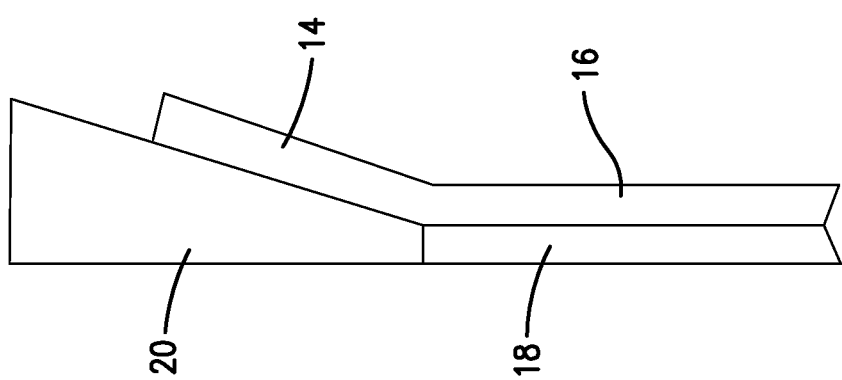
FIG. 2 is a fragmentary cross-sectional elevation view of a portion of the system of FIG. 1 after layup of the composite laminate structure and with first and second tool components of a layup tool in place, wherein the second tool component imparts an initial angle to an end portion of the composite laminate structure.
Figure 6:
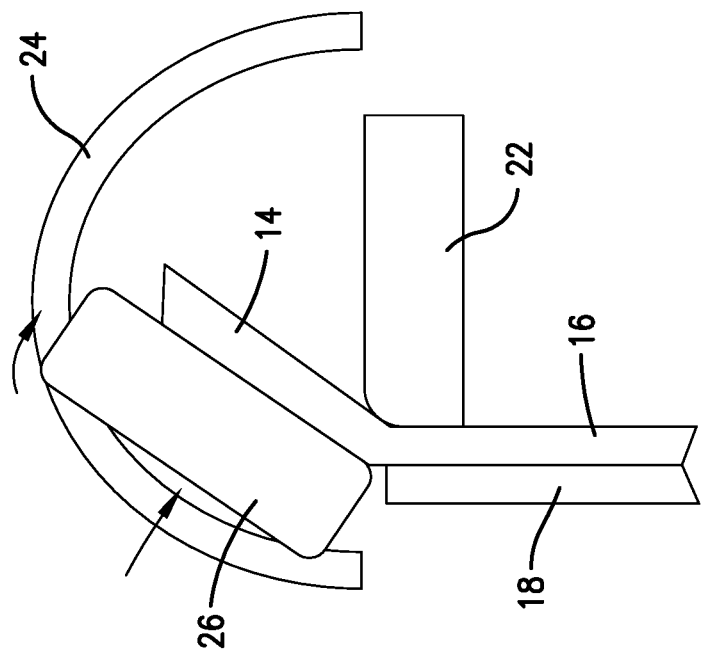
FIG. 6 is a fragmentary cross-sectional elevation view of the portion of the system of FIG. 5 with the heater and the roller applying heat and pressure to bend the end portion, wherein the integral flange is shown at an intermediate stage.
Figure 5:
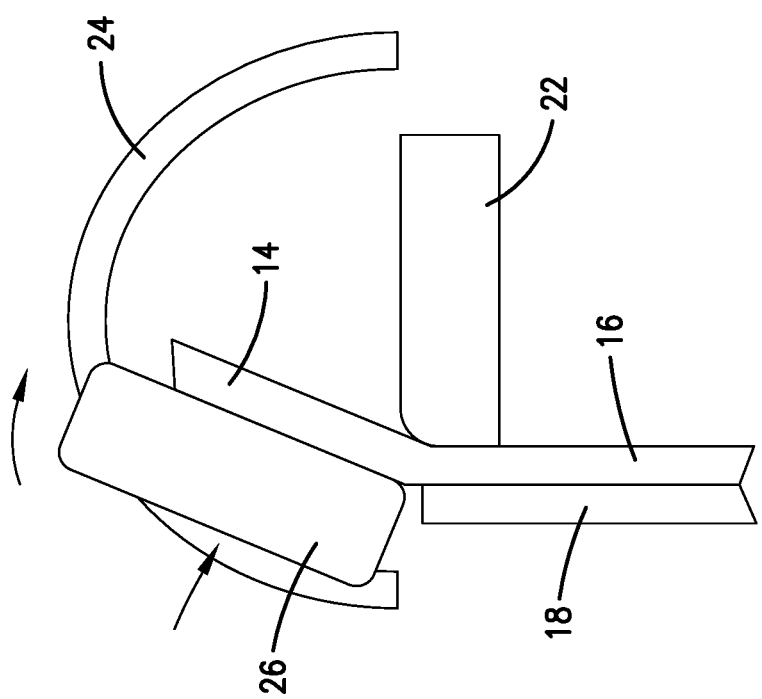
FIG. 5 is a fragmentary cross-sectional elevation view of the portion of the system of FIG. 4 with the heater and the roller applying heat and pressure to bend the end portion, wherein the integral flange is shown at an initial stage.
Figure 8:
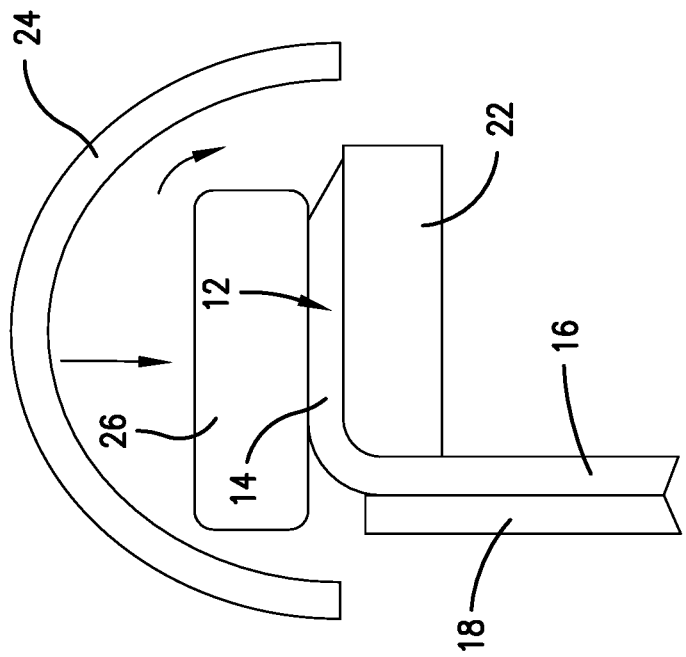
FIG. 8 is a fragmentary cross-sectional elevation view of the portion of the system of FIG. 7 with the heater and the roller applying heat and pressure to bend the end portion, wherein the integral flange is shown at a final stage.
Figure 7:
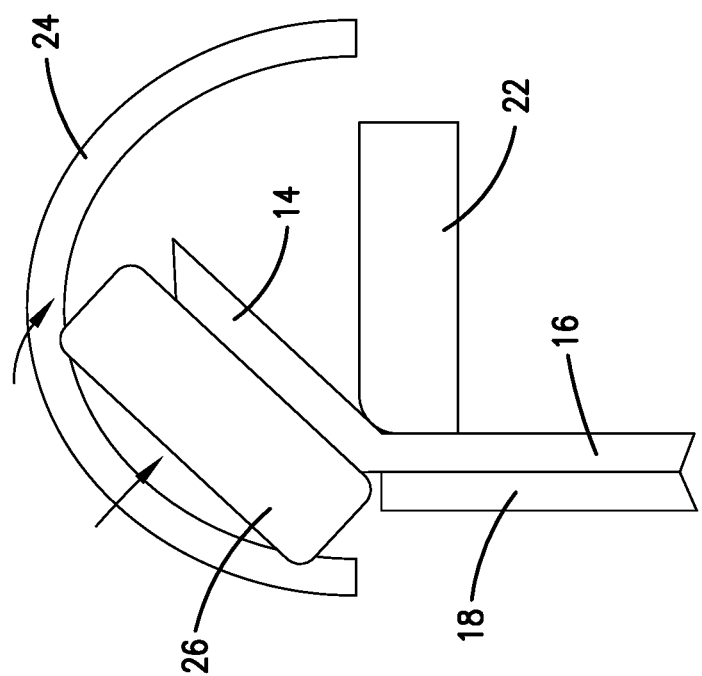
FIG. 7 is a fragmentary cross-sectional elevation view of the portion of the system of FIG. 6 with the heater and the roller applying heat and pressure to bend the end portion, wherein the integral flange is shown at a further intermediate stage.

As seen in FIG. 2, the first and second tool components 18, 20 may temporarily abut or otherwise be positioned and cooperate to provide a continuous or substantially continuous surface to support the composite laminate structure 16 during the layup process involving a plurality of plies of fibers which are impregnated with a resin. The initial layup of fibers and resin to form the composite laminate structure 16 may be accomplished by an automated fiber placement machine. The fibers of one or more of the plies may be oriented so as to extend parallel and radially or otherwise angularly relative to a longitudinal axis A of the composite laminate structure 16 so as to facilitate slippage during the flange-forming process. The fibers may be longer than ultimately needed to account for loss of length, especially in the one or more outer layers of fibers (which is represented in FIGS. 5-8 and 11 as beveling at the end of the end portion of the structure 16), during the flange-forming process.

The second tool component 20 may be configured so as to impart an initial angle to the end portion 14 relative to the rest of the structure 16 in the direction of the desired flange. This initial angle may be between approximately five degrees and forty-five degrees, or approximately between fifteen degrees and thirty-five degrees. In one implementation, the first and second tool components 18,20 may abut at the apex of this initial angle. In one implementation, during layup, less heat and/or pressure may be applied approximately at the apex of the initial angle so as to facilitate subsequent slippage of the fibers over each other during the flange-forming process. The second tool component 20 may be removable after layup to facilitate the remainder of the flange-forming process.

Figure 4:
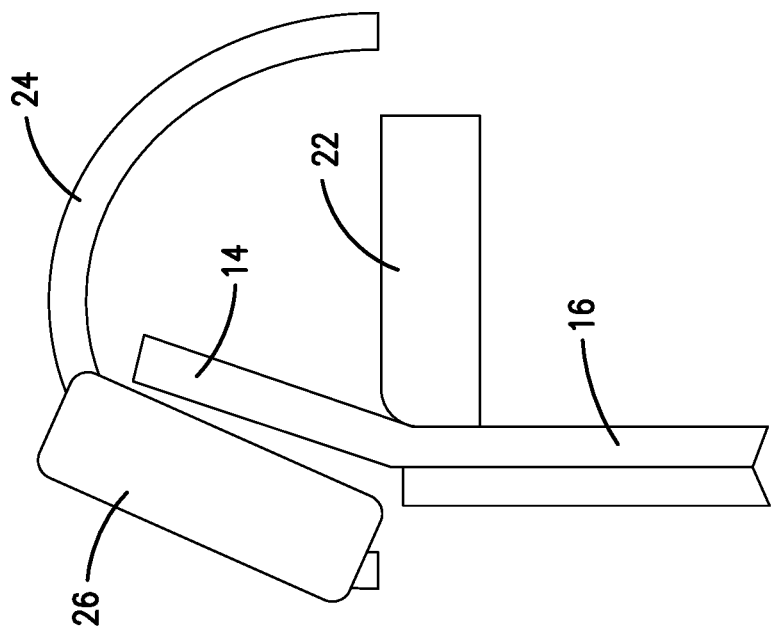
FIG. 4 is a fragmentary cross-sectional elevation view of the portion of the system of FIG. 3 with a heater component and a roller component in place to bend the end portion of the composite laminate structure to create the integral flange.
Figure 3:
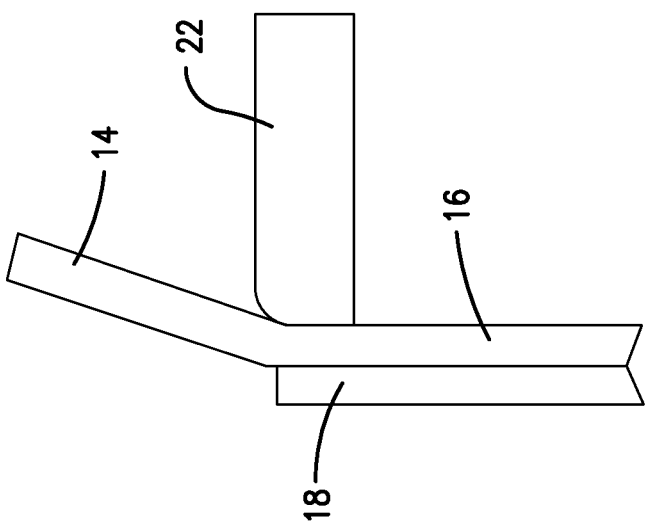
FIG. 3 is a fragmentary cross-sectional elevation view of the portion of the system of FIG. 2 with the second tool component removed and a third tool component installed, wherein the third tool component facilitates bending the end portion of the composite laminate structure to create the integral flange.

After layup, the third tool component 22 may be positioned opposite the first tool component 18 approximately at the apex of the initial angle. The third tool component 22 may include a male radius positioned approximately at the apex, and against and around which the end portion 14 of the composite laminate structure 16 may be bent to form the flange 12. Once so positioned, the third tool component 22 may provide a structure against which to form the flange 12. As seen in FIGS. 2 and 3, the third tool component 22, as well as the first and second tool components 18,20, may be provided in segments to facilitate assembly and disassembly and/or may be provided with structural supports as desired or needed to accomplish their functions.

The heater 24 may be configured to heat a succession of localized areas 30 (depicted in FIG. 10) of the end portion 14 of the composite laminate structure 16 to facilitate the flange-forming process. In particular, such heating lowers the viscosity of the resin and thereby promotes the slippage and trellising of fibers as the end portion 14 is bent by the roller 26. Further, heating, particularly of the apex, may allow the roller to minimize bulk and thereby reduce consolidation wrinkles. Thus, in operation, the heater 24 may heat the succession of localized areas 30 ahead of the roller 26 around or otherwise along the end portion 14 of the structure 16. In one implementation, each localized area 30 may be heated to approximately between 130 degrees and 150 degrees Fahrenheit. The heater 24 may employ substantially any suitable heating technology, such as radiant, inductive, or convective. In one example, the heater 24 may deliver a stream of heated air against each localized area 30 of the end portion 14.

The roller 26 may be configured to apply pressure to each heated localized area 30 of the end portion 14 of the structure 16 in order to incrementally push it around and against the third tool component 22 and thereby form the flange angle and the flange 12. In one implementation, the roller 26 may be configured to apply relatively higher pressure on the inflection point at the apex of the angle, thereby minimizing wrinkling and promoting slippage along the length of the end portion 14. The roller 26 may apply relatively lower pressure near the opposite end (opposite to the apex of the angle), thereby accommodating slippage. In particular, the outermost portion of the end portion 14 is not supported by the third tool component 22 until the flange is substantially completely formed, and this lack of compaction pressure eases interplay slippage. Intermediate between the apex and the end, slippage between plies may occur incrementally, thereby minimizing viscoelastic stresses which might otherwise occur if rapidly formed.

In one implementation, the roller 26 may come behind the heater 24 to apply pressure to each heated localized area 30 around or otherwise along the end portion 14 of the structure 16. In one implementation, the roller 26 may make two or more passes around or otherwise along the end portion 14 while increasing its angle and the angle of the end portion 14 with each successive pass until the final flange angle is achieved and the flange 12 is formed against the third tool component 22 (an incremental process shown in FIGS. 4-8). In one implementation, the final flange angle may be approximately between seventy-five degrees and one hundred five degrees, or approximately ninety degrees. The roller 26 may be constructed of substantially any suitable material, such as inflatable, hollow, or solid elastomeric material and may be segmented to reduce scrubbing in the end portion 14.

As seen in FIG. 9, after forming, the third tool component 22 may be removed, a fourth tool component 34 may be installed over the end portion 14, and a bag 36 and, as desired or needed, sealant tape 38 may be applied in preparation for curing.

Referring against to FIG. 1, in various implementations, the heater 24 and/or roller 26 may be mounted on an arm 32 and move around or otherwise along the stationary end structure 16; the structure 16 may be moved relative to the stationary heater 24 and/or roller 26; or both the heater 24 and/or roller 26 and the structure 16 may be moved (e.g., rotated in opposite directions).

In one implementation, the heater 24 may be incorporated into or otherwise combined with the roller 26. In one implementation, the roller may be replaced by a slider which slides rather than rolls over the composite laminate structure during the forming of the flange, but which may otherwise function similarly or identically.

The system 10 may include more, fewer, or alternative components and/or perform more, fewer, or alternative actions, including those discussed elsewhere herein, and particularly those discussed in the following section describing the method 110.

Referring also to FIG. 12, an embodiment of a method 110 is shown for forming an integral flange 12 in an end portion 14 of a composite laminate structure 16 after layup. Broadly, the method 110 may comprise the following steps which may be implemented by a system such as the system 10 described above, and as such, reference will be made to the components of the system 10. The method 110 may have example application in manufacturing composite laminate aerospace or other vehicle structures, such as in forming flanges in uncured composite laminate barrel structures. Thus, the composite laminate structure 16 may be a fan case, inlet barrel, or other generally cylindrical structure for incorporation into an aerospace or other vehicle.

The first and second tool components 18,20 may be temporarily abutted or otherwise positioned and cooperate to provide a continuous or substantially continuous surface to support the composite laminate structure 16 during the layup process involving a plurality of plies of fibers which are impregnated with a resin, as shown in step 112 and as seen in FIG. 2. The initial layup of fibers and resin to form the composite laminate structure 16 may be performed, as shown in step 114. This may be accomplished by an automated fiber placement machine. The fibers of one or more of the plies may be oriented so as to extend parallel and radially or otherwise angularly relative to a longitudinal axis A of the composite laminate structure 16. The fibers may be longer than ultimately needed to account for loss of length, especially in the one or more outer layers of fibers (which is represented in FIGS. 5-8 as beveling at the end of the end portion 14), during the flange-forming process.

An initial angle may be imparted by the second tool component 20 to the end portion 14 relative to the rest of the structure 16 in the direction of the desired flange, as shown in step 116. This initial angle may be between approximately five degrees and forty-five degrees, or approximately between fifteen degrees and thirty-five degrees. In one implementation, the first and second tool components 18,20 may abut at the apex of this initial angle. In one implementation, during layup, heat and/or pressure may be applied approximately at the apex of the initial angle so as to facilitate subsequent slippage of the fibers over each other during the flange-forming process. The second tool component 20 may be removed after layup to facilitate the remainder of the flange-forming process, as shown in step 118, and as seen FIG. 3.

After layup, the third tool component 22 may be positioned opposite the first component 18 approximately at the apex of the initial angle, as shown in step 120 and as seen in FIG. 3. The third tool component 22 may include a male radius positioned approximately at the apex of the initial angle and against and around which the end portion 14 of the composite laminate structure 16 is bent to form the flange 12. Once so positioned, the third tool component 22 may provide a structure against which to form the flange 12.

A succession of localized areas 30 of the end portion 14 of the composite laminate structure 16 may be heated with the heater 24 to facilitate the flange-forming process, as shown in step 122. In particular, such heating lowers the viscosity of the resin and thereby promotes the slippage and trellising of fibers as the end portion 14 is bent by the roller 26. Further, heating, particularly of the apex, may minimize bulk and thereby consolidate wrinkles which might otherwise occur during subsequent curing. Thus, in operation, the heater 24 may heat the succession of localized areas 30 ahead of the roller 26 around or otherwise along the end portion 14 of the structure 16. In one implementation, each localized area 30 may be heated to approximately between 130 degrees and 150 degrees Fahrenheit. The heater 24 may employ substantially any suitable heating technology, such as radiant or convective.

Each heated localized area of the end portion 14 of the structure 16 may be subjected to pressure applied by the roller 26 in order to incrementally push it around and against the third tool component 22 and thereby form the flange 12, as shown in step 124. In one implementation, the roller 26 may be configured to apply relatively higher pressure on the inflection point at the apex of the angle, thereby minimizing wrinkling and promoting slippage along the length of the end portion 14. The roller 26 may be further configured to apply relatively lower pressure near the end, thereby accommodating slippage. Intermediate between the apex and the end, slippage between plies may occur incrementally, thereby minimizing viscoelastic stresses.

In one implementation, the roller 26 may come behind the heater 24 to apply pressure to each localized area 30 around or otherwise along the end portion 14 of the structure 16. In one implementation, the roller 26 may make two or more passes around or otherwise along the end portion 14 of the structure 16 while increasing its angle and the angle of the end portion 14 for each successive pass until the final flange angle is achieved and the flange 12 is formed against the third tool component 22, as shown in step 126. In one implementation, the final flange angle may be approximately between seventy-five degrees and one hundred five degrees, or approximately ninety degrees. The roller 26 may be constructed of substantially any suitable material, such as inflatable, hollow, or solid elastomeric material with a solid construction or may be segmented along its length to minimize scrubbing of the roller on the composite due to differential surface speed.

Once forming is complete, a fourth tool component 34 may be positioned over the end portion 14, and the composite laminate structure 16 may be otherwise prepared for curing, as shown in step 128.

Referring again to FIG. 1, in various implementations, the heater 24 and/or roller 26 may be mounted on an arm 32 and move around or otherwise along the stationary structure 16; the structure 16 may be moved relative to the stationary heater 24 and/or roller 26; or both the heater 24 and/or roller 26 and the structure 16 may be moved (e.g., rotated in opposite directions).

In one implementation, the heater 24 may be incorporated into or otherwise combined with the roller 26. In one implementation, the roller may be replaced by a slider which slides rather than rolls over the composite laminate structure during the forming of the flange, but which may otherwise function similarly or identically.

The method 110 may include more, fewer, or alternative actions, including those discussed elsewhere herein and particularly those discussed in the preceding section describing the system 10.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for forming an integral flange in an end portion of a composite laminate structure, the system comprising:
  a first tool component and a second tool component cooperating to physically support the composite laminate structure during a layup process involving a plurality of plies of fibers impregnated with a resin, with the second tool component imparting an initial angle to the end portion;
  a third tool component comprising a male radius positioned opposite the first tool component at an apex of the initial angle;
  a heater heating a succession of localized areas along the end portion to lower a viscosity of the resin; and
  a roller applying pressure to each localized area along the end portion after each localized area is heated so as to push each localized area around the third tool component to form a flange angle and against the third tool component to form the integral flange, wherein the heater and the roller make two or more passes along the end portion, and with each pass an angle of the roller is increased until the flange angle is achieved.

2. The system of claim 1, wherein the composite laminate structure is a component of an aerospace vehicle.

3. The system of claim 1, wherein the initial angle is between five degrees and forty-five degrees.

4. The system of claim 1, the heater heating the localized area to between one hundred thirty degrees and one hundred fifty degrees Fahrenheit.

5. The system of claim 1, the heater heating each localized area by delivering a stream of heated air against each localized area.

6. The system of claim 1, the roller applying a relatively higher pressure against the end portion at the apex of the flange angle, and applying a relatively lower pressure against an opposite end of the end portion.

7. The system of claim 1, the heater and the roller remaining stationary while the end portion is moved past the heater and the roller.

8. The system of claim 1, further comprising an arm physically supporting the heater and the roller and moving the heater and the roller along the end portion.

9. The system of claim 1, wherein the flange angle is between seventy-five degrees and one hundred five degrees.

10. A method for forming an integral flange in an end portion of a composite laminate structure, the method comprising:
    positioning a first tool component and a second tool component so as to cooperate in physically supporting the composite laminate structure during a layup process involving a plurality of plies of fibers impregnated with a resin, with the second tool component imparting an initial angle to the end portion;
    positioning a third tool component comprising a male radius opposite the first tool component at an apex of the initial angle;
    heating with a heater a succession of localized areas along the end portion to lower a viscosity of the resin; and
    applying with a roller pressure to each localized area along the end portion as each localized area is heated so as to push each localized area around the third tool component to form the flange angle and against the third tool component to form the integral flange,
    wherein the heater and the roller make two or more passes along the end portion, and with each pass an angle of the roller is increased until the flange angle is achieved.

11. The method of claim 10, wherein the composite laminate structure is a component of an aerospace vehicle.

12. The method of claim 11, wherein the initial angle is between five degrees and forty-five degrees.

13. The method of claim 11, the heater heating each localized area to between one hundred thirty degrees and one hundred fifty degrees Fahrenheit.

14. The method of claim 11, the heater heating each localized area by delivering a stream of heated air against each localized area.

15. The method of claim 11, the roller applying a relatively higher pressure against the end portion at the apex of the flange angle, and applying a relatively lower pressure against an opposite end of the end portion.

16. The method of claim 11, the heater and the roller remaining stationary while the end portion is moved past the heater and the roller.

17. The method of claim 11, further comprising physically supporting the heater and the roller on an arm which moves the heater and the roller along the end portion.

18. The method of claim 11, wherein the flange angle is between seventy-five degrees and one hundred five degrees.

19. A method for forming an integral flange in an end portion of a composite laminate structure, the method comprising:
    positioning a first tool component and a second tool component so as to cooperate in physically supporting the composite laminate structure during a layup process involving a plurality of plies of fibers impregnated with a resin, with the second tool component imparting an initial angle to the end portion, wherein the initial angle is between five degrees and forty-five degrees;
    positioning a third tool component comprising a male radius opposite the first tool component at an apex of the initial angle;
    heating with a heater a succession of localized areas to between one hundred thirty degrees and one hundred fifty degrees Fahrenheit along the end portion to lower a viscosity of the resin; and
    applying with a roller pressure to each localized areas along the end portion as each localized area is heated so as to push each localized area around the third tool component to form the flange angle and against the third tool component to form the integral flange,
    wherein the heater and the roller make two or more passes along the end portion, and with each pass an angle of the roller is increased until the flange angle is achieved, wherein the flange angle is between seventy-five degrees and one hundred five degrees.

20. The method of claim 19, wherein the composite laminate structure is a component of an aerospace vehicle.

\* \* \* \* \*